United States Patent [19]
Littman et al.

[11] 3,820,590
[45] June 28, 1974

[54] ON-LINE ADAPTIVE CONTROL OF A HEAT EXCHANGER

[76] Inventors: Bernard Littman, 7813 William Ave., Philadelphia, Pa. 19150; Paul Garson Friedmann, 701 Linden Rd., Wyndmoor, Pa. 19118

[22] Filed: Feb. 28, 1973

[21] Appl. No.: 336,670

[52] U.S. Cl. ................................. 165/26, 165/39
[51] Int. Cl. ............................................ F25b 29/00
[58] Field of Search ............ 165/39, 40, 26, 27, 28, 165/14

[56] References Cited
UNITED STATES PATENTS
| | | | |
|---|---|---|---|
| 3,391,729 | 7/1968 | Wilson | 165/39 |
| 3,645,697 | 2/1972 | Hoffman, Jr. | 165/39 |

*Primary Examiner*—Charles Sukalo
*Attorney, Agent, or Firm*—William G. Miller, Jr.; Raymond F. MacKay

[57] ABSTRACT

A temperature controlling system applied to a counter-flow heat exchanger is made adaptive by modifying the proportional gain of the controlling system so as to maintain the loop gain constant as the temperature of the cooling water changes. When the hot side flow is constant and the heat transfer requirement is constant the proportional gain is adjusted in accordance with the product of the cold side flow squared times the difference between the inlet temperatures of the hot and cold side. Otherwise, the expression must include the heat transfer variation and the variation in hot side flow.

7 Claims, 4 Drawing Figures

ON-LINE ADAPTIVE CONTROL OF A HEAT EXCHANGER

BACKGROUND OF THE INVENTION

This invention relates to the control of the temperature at the outlet of a heat exchanger in which the flow of one of the fluids, that fluid whose temperature is not being controlled, is varied to control the outlet temperature of the other fluid. Thus, the gain of the heat exchange process, defined as the rate of change of the controlled temperature with manipulated flow, can change drastically as uncontrolled variables of the process change. For example, if river water is used as a coolant for a generator lube oil cooler, slow seasonal changes in river temperature can change the gain of the process by one or two orders of magnitude. Such changes create a problem in that the temperature control can not, under such circumstances, be optimally tuned when the river water temperature is at one extreme, for then the tuning, when the river water temperature is at the other extreme, would be improper, causing either oscillatory control or sluggish control depending upon the extreme at which the tuning was made.

While it is possible to precalculate the proportional gain which may be desired in the control system for various temperatures of the fluid whose flow is being controlled, this precalculation is difficult and usually inaccurate and hence it is more advantageous to make on-line adaptation of the control directly in response to changes in the temperature of the fluid whose flow is being varied. Furthermore, precalculation requires knowledge of the heat transfer coefficient and as the coefficient changes with the operating conditions, those conditions would involve the iterative solution of a transcendental equation.

SUMMARY OF THE INVENTION

In carrying out this invention, the operation of the control system for the closed heat exchanger involved includes the steps of measuring not only the rate of flow of a first fluid through the heat exchanger, that is, the fluid whose flow is to be manipulated, but also the temperature of a second fluid as it enters the heat exchanger, the second fluid being that whose temperature is controlled, and the temperature at the inlet for the first fluid to the heat exchanger. There is produced from those measurements a signal representing the product of the square of the rate of flow of the first fluid and the difference between the inlet temperatures of the fluids. That signal is then used to modify the proportional gain of the controlling system in the control loop formed by the controlling system and the heat exchanger so that the modifications of the proportional gain are in the sense to maintain the loop gain substantially constant as the system conditions such as the temperature of the first fluid vary.

DESCRIPTION OF THE PREFERRED EMBODIMENTS

Figure 1:
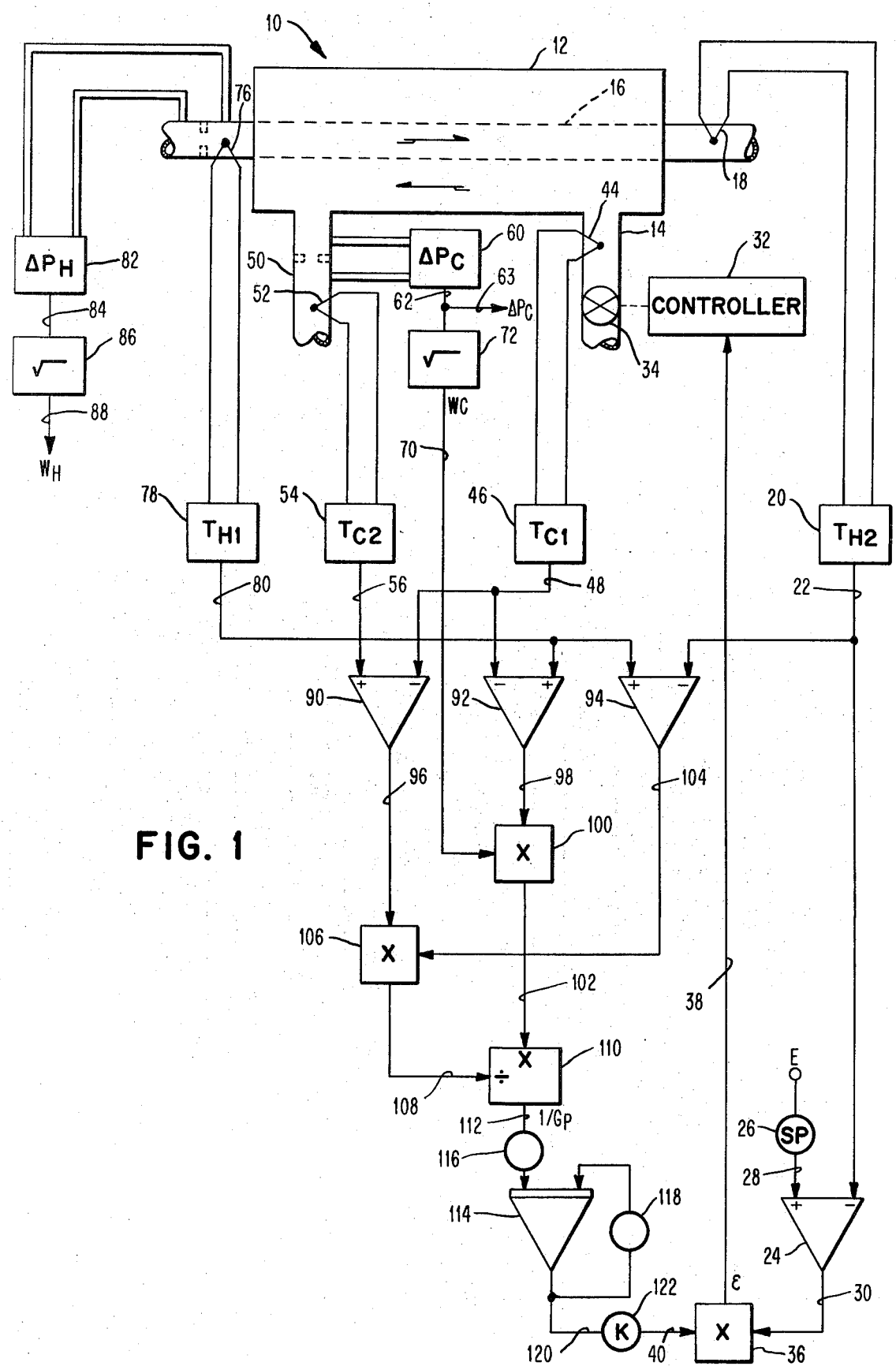
FIG. 1 is a circuit diagram, partially in block form showing one form of the invention as it is applied to a counter flow heat exchanger.

In FIG. 1 a counter flow heat exchanger 10 is shown as being constructed with an outer shell 12 which receives through the pipe 14 a first fluid which flows in the direction indicated, along the periphery of the pipe 16 which carries a second fluid in the direction indicated by the arrow.

In the normal operation of a counter flow heat exchanger of the type shown, the temperature of the second fluid is usually measured, as shown in FIG. 1, by thermocouple 18 at the outlet of the heat exchanger. That measurement can be made as by an instrument 20 which then may indicate and/or record the temperature of the second fluid at the outlet, $T_{H2}$. A signal proportional to the $T_{H2}$ is then transmitted on line 22 to the inverting input of a differential amplifier 24 where it is compared with a set point value.

The set point value is introduced to the amplifier 24 at its non-inverting input by the adjustment of the potentiometer 26 so that the supply potential E will provide on line 28 the input signal to amplifier 24 indicative of the set point value for the temperature at the outlet of the heat exchanger.

The output of the amplifier 24 on line 30 would normally be the error signal which would be used by the controller 32 as an input signal upon which to base the control of valve 34 in pipe 14 thereby varying the flow of the first fluid so as to control the temperature at the outlet for the second fluid.

In FIG. 1 the error signal on line 30 is modified by the multiplier 36 to produce the error $\epsilon$ on line 38 which is, in FIG. 1, the error signal which controller 32 responds to. The multiplier 36 is used, as will be explained subsequently, as a means for modifying the gain of the controlling system, and more specifically the proportional gain, the modification being effected by the input on line 40 to multiplier 36. Thus, when the input on line 40 is 1, the control system, as thus far described, may be considered as the normal control system applied to heat exchangers for the purpose of controlling the outlet temperature of one fluid.

The heat exchanger may be used to either cool the fluid in pipe 16 or to heat the fluid depending upon the application involved.

In a number of applications, fluid introduced through pipe 14 is introduced for the purpose of cooling the fluid in pipe 16. When, for example, the fluid introduced through pipe 14 is river water, its temperature is subject to seasonal temperature variations or even day to day variations of sufficient magnitude so as to make necessary a retuning of the temperature control in order that that control may at all times be optimum.

Applicants have discovered a relatively simple approach to modifying the proportional gain of the controlling system so that that control system gain will always be held constant as the temperature of the fluid introduced through pipe 14 varies. The modification of the proportional gain may, as previously mentioned, be provided by the introduction of a signal on line 40 to the multiplier 36. Several methods of calculating that signal will now be described. In the method of FIG. 1, the inlet temperature of the first fluid is measured in pipe 14 by the thermocouple 44 which is connected to the measuring instrument 46 which retransmits a signal proportional to that measurement on line 48 so that there appears on line 48 a signal proportional to $T_{c1}$, that is, the inlet temperature of the cooling water or the first fluid through pipe 14. The temperature at the outlet of the heat exchanger for the fluid introduced through pipe 14 is also measured in the outlet pipe 50 by thermocouple 52 which is connected to the measuring instrument 54 which in turn provides on line 56 a signal proportional to that outlet temperature, namely, $T_{c2}$.

In addition to the temperature measurement in the pipe 50 the flow of the first fluid is measured in pipe 50 by first measuring the pressure drop across an orifice in pipe 50 by means of the differential pressure indicator 60 which produces on lines 62 and 63 a signal indicative of the pressure drop across the orifice in pipe 50. That signal is noted as $\Delta P_C$ which is, of course, proportional to the square of the flow in the pipe 50 and hence proportional to $W_C^2$, where $W_C$ is the rate of flow.

In order to obtain a signal directly related to the rate of flow, $W_C$ on line 70, a square root extractor 72 is used to convert the signal on line 62 to a signal representing the flow measurement $W_C$ on line 70.

The inlet temperature for a second fluid is also measured as, for example, with thermocouple 76 which is connected to the measuring instrument 78 and which produces on line 80 a signal representative of the inlet temperature $T_{H1}$.

A further measurement is made relating to the second fluid, namely, the flow measurement at the inlet to the heat exchanger as shown by the pressure differential measurement made by the instrument 82 which indicates the pressure differential across the orifice in pipe 16 at the inlet end. That differential pressure measurement $\Delta P_H$ is connected to the square root extractor 86 which then provides on line 88 a signal representative of the flow of the second fluid $W_H$. While the signal $W_H$ is not utilized in the circuit of FIG. 1, it is used in other variations of the circuit for producing the signal on line 40, as will be discussed in the discussion of the other figures.

Utilizing the measurements above described, the signal on line 40 may be calculated as shown in FIG. 1 by utilizing the differential amplifiers 90, 92 and 94. The amplifier 90 calculates the quantity $(T_{c2} - T_{c1})$ in that it receives on its non-inverting input the signal on line 56, $T_{c2}$, and receives at its inverting input the signal from line 48, $T_{c1}$, so that amplifier 90 produces on its output line 96 a signal indicative of that temperature difference.

Amplifier 92 receives at its non-inverting input the signal on line 80 representative of $T_{H1}$ and also receives at its inverting input the signal $T_{c1}$ so that it produces on its output line 98 a signal representative of $(T_{H1} - T_{c1})$. The signal on line 98 is multiplied in mulliplier 100 by the signal on line 70 representative of $W_C$ so that on the output line of multiplier 100, namely 102, there is produced a signal representative of $W_C (T_{H1} - T_{c1})$.

The amplifier 94 receives a signal from line 80 at its non-inverting input and also receives a signal at its inverting input from line 22 so that there is produced on its output line 104 a signal representative of $(T_{H1} - T_{H2})$. That signal is then multiplied in multiplier 106 by the signal on line 96 so that there is produced on line 108 a signal representative of $(T_{c2} - T_{c1})(T_{H1} - T_{H2})$.

The divider 110 then divides the signal on line 102 by the signal on line 108 to produce a signal appearing on the output line 112 which is representative of the reciprocal of the process gain.

The integrating amplifier 114 along with its input potentiometer 116 and its feedback potentiometer 118 forms a first order lag which is operable to modify the signal supplied on line 112 so that the signal on line 120 to the scaling potentiometer 122 represents a lagged version of the reciprocal of the process gain. The signal on line 120 is then multiplied by the scaling factor K through the operation of the scaling potentiometer 122 to provide the signal on line 40 for modifying the proportional gain of the controlling system.

Figure 2:
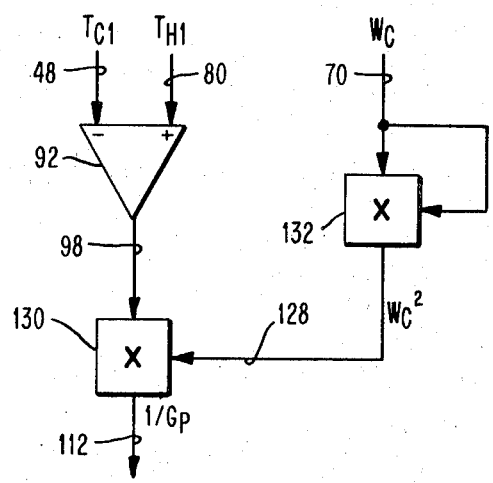
FIG. 2 is a partial diagram showing an alternative means for producing the signal required to change the gain of the controlling system.

When the flow $W_H$ and the heat transferred in the heat exchanger are constant, the process gain has been found to be roughly proportional to the reciprocal of $[W_C^2 (T_{H1} - T_{c1})]$. Therefore, the signal $1/G_P$, the reciprocal of the process gain, as used to modify the signal on line 40, can be calculated as shown in FIG. 2 wherein the reference characters represent like elements in FIG. 1. Thus, amplifier 92 produces an output signal on line 98 as in FIG. 1, and that signal is multiplied by the signal on line 128 by operation of the multiplier 130 so as to produce at the output of that multiplier, line 112, the signal $1/G_P$.

Figure 3:
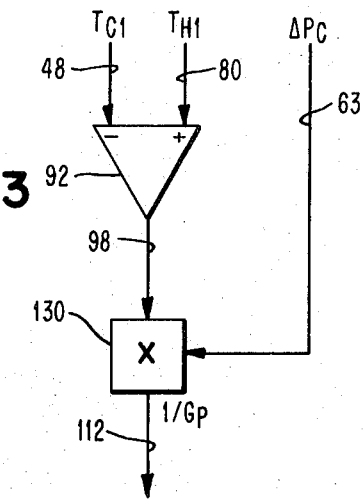
FIG. 3 is still another variation of the circuit of FIG. 2.

In FIG. 2 the signal on line 128 is representative of the quantity $W_C^2$ in that the multiplier 132 operates to multiply the signal $W_C$ by itself. It will be recognized that in a measurement of the rate of flow, $W_C$, as shown in FIG. 1, there is obtained on line 63 a quantity which is representative of the square of that flow, or in other words, $W_C^2$, which is also equal to the quantity $\Delta P_C$. Thus, in place of the use of the multiplier 132 to square the quantity $W_C$, as shown in FIG. 2, there may be substituted as shown in FIG. 3, the signal $\Delta P_C$ from line 63 as an input to the multiplier 130 to obtain on the output line 112 of the multiplier 130 a signal, $1/G_P$, similar to that of FIG. 2.

Figure 4:
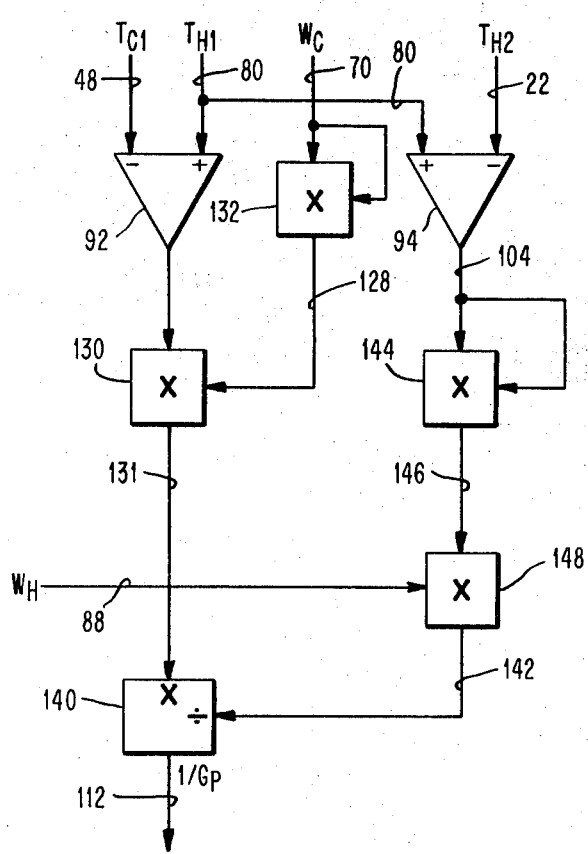
FIG. 4 is another variation of the circuit required to calculate the signal for modifying the gain of the controlling system.

The adapting signal $1/G_P$ may be obtained in still another way as, for example, by that method of calculations exemplified by the block diagram of FIG. 4 wherein like reference characters represent like elements of FIG. 1 and FIG. 2.

In FIG. 4 the signal on line 112 is comparable to that produced in FIG. 2 on the same line and thus it represents $W_C^2 (T_{H1} - T_{c1})$. That signal is then divided by the signal on line 142 by divider 140 to obtain the signal $1/G_P$ for producing the signal on line 40.

In FIG. 4 the signal on line 142 is obtained by multiplying the signal on line 104 by itself in multiplier 144 so that there is obtained at the output of the multiplier on line 146, a signal representing $(T_{H1} - T_{H2})^2$. The signal on line 146 is then multiplied in multiplier 148 by the signal on line 88 to produce a signal which then appears on output line 142 of multiplier 148. The signal $1/G_P$ may then be calculated by dividing the signal on line 131 by the signal on line 142 in divider 140 to produce on line 112 a signal representative of $W_C^2 (T_{H1} - T_{c1})/W_H (T_{H1} - T_{H2})^2$.

The arrangement of FIG. 4 may be considered to have some disadvantages as compared with the other approach in that an additional flow measurement $W_H$ is required.

It should be noted that the calculations which are utilized to determine the process gain and to thereby modify or adapt the proportional gain of the controlling system do not require a knowledge of the heat transfer coefficient of the heat exchanger and the more usual iterative calculations are not required. The only restriction as to the usefulness of the calculations as carried out by the several embodiments described above is that the process conditions must be such that the average temperature difference $(T_{H1} - T_{C2} + T_{H2} - T_{C2})/2$ is a reasonable expression of the log-mean temperature difference $(T_{H1} - T_{C2} - T_{H2} + T_{C1})/\ln[(T_{H1} - T_{C2})/(T_{H2} - T_{C1})]$. This condition is satisfied within 10 percent if the ratio of the larger to the smaller terminal temperature difference is less than 3. It is proposed that even for larger ratios, calculations by the methods set forth above may still be acceptable in that the error will be comparatively small relative to the possible error using constant gain under the full range of process conditions. The controller 32 may be any of a number of commercially available process controllers designed to position a valve in response to an error signal. the responses may include proportional, reset and rate action as in the standard three-action controller. Likewise, the temperature measuring instruments 20, 46, 54 and 78 may be any of a number of commercially available instruments for measuring temperature by means of thermocouples and providing a retransmitted signal representative of the measured value. The differential pressure units 60 and 82 and the square root extractors 72 and 86 and commercially available units as are the amplifiers, multipliers and dividers as well as the associated potentiometers.

It will be evident to those skilled in the art that while the invention is described as being applied to a counter flow heat exchanger, it is equally applicable to other types of closed heat exchangers.

It will also be evident that the required gain change in the controlling system may be accomplished by automatically changing the gain setting in the controller 32.

What is claimed is:

1. The method for maintaining the loop gain of a control system formed by a temperature controlling system and a closed heat exchanger when the rate of flow of a first fluid through said heat exchanger is the manipulated variable controlling the temperature of a second fluid after it has passed through said heat exchanger so that the loop gain of the system is substantially constant under varying system conditions, comprising the steps of:

measuring the rate of flow of said first fluid through said heat exchanger, measuring the temperature at the inlet to the heat exchanger for said first fluid, measuring the temperature at the inlet for said second fluid to said heat exchanger, and modifying the proportional gain of the controlling system in response to a function of the product of the square of said rate of flow of said first fluid and the difference between the measured temperatures at the inlets for said first and second fluids, said modification being in sense to maintain said loop gain substantially constant as the conditions of the system vary.

2. The method as set forth in claim 1 which includes the steps of:

measuring the temperature of said first fluid at the outlet of said heat exchanger, measuring the temperature of said second fluid at the outlet of said heat exchanger, and modifying said function by dividing by the product of the rate of flow of said second fluid and the difference between the temperatures measured at the inlet and outlet for said first fluid all multiplied by the measured temperature differences between the inlet and outlet for said second fluid.

3. The method of claim 1 which includes the steps of:

measuring the temperature of said second fluid at the outlet of said heat exchanger, measuring the rate of flow of said second fluid through said heat exchanger, and modifying said function by dividing by the product of the rate of flow of said second fluid as measured and the square of the temperature difference between the inlet and outlet for the second fluid in said heat exchanger.

4. In the operation of a control system for a closed heat exchanger for fluids in which the flow of a first fluid is the manipulated variable controlling the temperature of a second fluid after it has passed through the heat exchanger, the method for maintaining the gain of the loop formed by the controlling system and the heat exchanger which make up said control system so that the loop gain is substantially constant under conditions of varying temperatures of said first fluid, comprising the steps of:

measuring the rate of flow of said first fluid through said heat exchanger, measuring the temperature of said second fluid as it enters said heat exchanger, measuring the temperature at the inlet for said first fluid to said heat exchanger, producing from said measurements a signal representing the product of the square of said rate of flow and the difference between said fluid temperatures, and modifying the proportional gain of the controlling system in response to said signal, said modification being in sense to maintain said loop gain substantially constant as the temperature of said first fluid at the heat exchanger inlet varies.

5. In the operation of a control system for a closed heat exchanger for fluids in which the flow of a first fluid is the manipulated variable controlling the temperature of a second fluid after it has passed through the heat exchanger, the method for maintaining the gain of the loop formed by the controlling system and the heat exchanger which make up said control system so that the loop gain is substantially constant under conditions of varying temperature of said first fluid, comprising the steps of:

measuring the rate of flow of said first fluid through said heat exchanger, measuring the temperature of said second fluid as it enters said heat exchanger, measuring the temperature at the inlet for said first fluid to said heat exchanger, producing from said measurements a first signal representing the product of said rate of flow and the difference between said fluid temperatures, measuring the temperature of said second fluid as it leaves said heat exchanger, measuring the temperature of said first fluid at the outlet of said heat exchanger, modifying said first signal by dividing the first signal by the product of a second signal representing the temperature difference between the inlet and outlet of said first fluid and a third signal representing the temperature difference between the inlet and outlet of said second fluid, and modifying the proportional gain of the controlling system in response to said modified first signal, said modification being in sense to maintain said loop gain substantially constant as the temperature of said first fluid at the heat exchanger inlet varies.

6. In the operation of a control system for a closed heat exchanger for fluids in which the flow of a first fluid is the manupulated variable controlling the temperature of a second fluid after it has passed through the heat exchanger, the method for maintaining the gain of the loop formed by the controlling system and the heat exchanger which make up said control system so that the loop gain is substantially constant under conditions of varying temperature of said first fluid, comprising the steps of:

measuring the rate of flow of said first fluid through said heat exchanger, measuring the temperature of said second fluid as it enters said heat exchanger, measuring the temperature at the inlet for said first fluid to said heat exchanger, producing from said measurements a first signal representing the product of the square of said rate of flow and the difference between said fluid temperatures, measuring the temperature of said second fluid as it leaves said heat exchanger, measuring the rate of flow of said second fluid through said heat exchanger, modifying said first signal by dividing the first signal by the product of a fourth signal representing said measurement of the rate of flow of said second fluid and a fifth signal representing the square of the temperature difference between the inlet and outlet of said second fluid, and modifying the proportional gain of the controlling system in response to said modified first signal, said modification being in sense to maintain said loop gain substantially constant as the temperature of said first fluid at the heat exchanger inlet varies.

7. In the operation of a control system for a closed heat exchanger for fluids in which the flow of a first fluid is the manipulated variable controlling the temperature of a second fluid after it has passed through the heat exchanger, the method for maintaining the gain of the loop formed by the controlling system and the heat exchanger which make up said control system so that the loop gain is substantially constant under conditions of varying temperature of said first fluid, comprising the steps of:

measuring the pressure drop across a flow restriction in the path of said first fluid through said heat exchanger, measuring the temperature of said second fluid as it enters said heat exchanger, measuring the temperature at the inlet for said first fluid to said heat exchanger, producing from said measurements a signal representing the product of the pressure drop due to flow of said first fluid and the difference between said fluid temperatures, and modifying the proportional gain of the controlling system in response to said signal, said modification being in sense to maintain said loop gain substantially constant as the temperature of said first fluid at the heat exchanger inlet varies.

* * * * *